(12) United States Patent
Hernandez et al.

(10) Patent No.: US 7,877,284 B2
(45) Date of Patent: Jan. 25, 2011

(54) METHOD AND SYSTEM FOR DEVELOPING AN ACCURATE SKILLS INVENTORY USING DATA FROM DELIVERY OPERATIONS

(75) Inventors: Milton H. Hernandez, Tenafly, NJ (US); Gopal Pingali, Mohegan Lake, NY (US); Prashant Pradhan, Mamaroneck, NY (US)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 11/446,512

(22) Filed: Jun. 5, 2006

(65) Prior Publication Data

US 2007/0282622 A1    Dec. 6, 2007

(51) Int. Cl.
*G06Q 10/00* (2006.01)
(52) U.S. Cl. ............................................. 705/9; 705/11
(58) Field of Classification Search ...................... 705/1, 705/9, 11
See application file for complete search history.

(56) References Cited

U.S. PATENT DOCUMENTS

| | | |
|---|---|---|
| 4,835,372 A | 5/1989 | Gombrich et al. |
| 5,724,262 A | 3/1998 | Ghahramani |
| 5,734,837 A | 3/1998 | Flores et al. |
| 5,765,138 A | 6/1998 | Aycock et al. |
| 5,774,661 A | 6/1998 | Chatterjee et al. |
| 5,826,239 A | 10/1998 | Du et al. |
| 5,850,535 A | 12/1998 | Maystrovsky et al. |
| 5,870,545 A | 2/1999 | Davis et al. |
| 5,884,302 A | 3/1999 | Ho |
| 5,937,388 A | 8/1999 | Davis et al. |
| 6,049,776 A * | 4/2000 | Donnelly et al. ................ 705/8 |
| 6,131,085 A | 10/2000 | Rossides |
| 6,249,769 B1 | 6/2001 | Ruffin et al. |
| 6,263,335 B1 | 7/2001 | Paik et al. |
| 6,339,838 B1 | 1/2002 | Weinman, Jr. |
| 6,363,384 B1 | 3/2002 | Cookmeyer, II et al. |
| 6,438,594 B1 | 8/2002 | Bowman-Amuah |
| 6,453,269 B1 | 9/2002 | Quernemoen |
| 6,473,794 B1 | 10/2002 | Guheen et al. |
| 6,496,209 B2 | 12/2002 | Horii |
| 6,523,027 B1 | 2/2003 | Underwood |
| 6,526,387 B1 | 2/2003 | Ruffin et al. |
| 6,526,404 B1 | 2/2003 | Slater et al. |

(Continued)

FOREIGN PATENT DOCUMENTS

WO    2007143516    12/2007

OTHER PUBLICATIONS

Tracking Your Changing Skills Inventory: Why It's Now Possible, and What It Means for Your Organization From CIO.Com Mid 2002 IT Staffing Update Brainbench.*

(Continued)

*Primary Examiner*—Beth V Boswell
*Assistant Examiner*—Ernest A Jackson
(74) *Attorney, Agent, or Firm*—Cahn and Samuels LLP

(57) ABSTRACT

A method and system for obtaining and storing accurate skills data relative to human resource objects of an enterprise. Relevant data is extracted from runtime processes that monitor the activities of the human resource objects and a metric value indicative of a skill level attained for each of a list of skills is calculated for each human resource object.

17 Claims, 1 Drawing Sheet

U.S. PATENT DOCUMENTS

| | | |
|---|---|---|
| 6,618,730 B1 | 9/2003 | Poulter et al. |
| 6,675,149 B1 | 1/2004 | Ruffin et al. |
| 6,738,736 B1 | 5/2004 | Bond |
| 6,810,383 B1 | 10/2004 | Loveland |
| 6,865,370 B2 | 3/2005 | Ho et al. |
| 6,879,685 B1 | 4/2005 | Peterson et al. |
| 6,907,549 B2 | 6/2005 | Davis et al. |
| 6,970,803 B1 | 11/2005 | Aerdts et al. |
| 6,988,088 B1 | 1/2006 | Miikkulainen et al. |
| 6,988,132 B2 | 1/2006 | Horvitz |
| 7,010,593 B2 | 3/2006 | Raymond |
| 7,039,606 B2 | 5/2006 | Hoffman et al. |
| 7,114,146 B2 | 9/2006 | Zhang et al. |
| 7,236,966 B1 | 6/2007 | Jackson et al. |
| 7,260,535 B2 | 8/2007 | Galanes et al. |
| 7,293,238 B1 | 11/2007 | Brook et al. |
| 7,315,826 B1 | 1/2008 | Guheen et al. |
| 7,364,067 B2 | 4/2008 | Steusloff et al. |
| 7,403,948 B2 | 7/2008 | Ghoneimy et al. |
| 7,412,502 B2 | 8/2008 | Fearn et al. |
| 7,467,198 B2 | 12/2008 | Goodman et al. |
| 7,562,143 B2 | 7/2009 | Fellenstein et al. |
| 7,580,906 B2 | 8/2009 | Faihe |
| 7,707,015 B2 | 4/2010 | Lubrecht et al. |
| 2001/0047270 A1 | 11/2001 | Gusick et al. |
| 2002/0019837 A1 | 2/2002 | Balnaves |
| 2002/0055849 A1 | 5/2002 | Georgakopoulos et al. |
| 2002/0091736 A1 | 7/2002 | Wall |
| 2002/0111823 A1 | 8/2002 | Heptner |
| 2002/0140725 A1 | 10/2002 | Horii |
| 2002/0147809 A1 | 10/2002 | Vinberg |
| 2002/0161875 A1 | 10/2002 | Raymond |
| 2002/0169649 A1 | 11/2002 | Lineberry et al. |
| 2002/0186238 A1 | 12/2002 | Sylor et al. |
| 2003/0004746 A1 | 1/2003 | Kheirolomoom et al. |
| 2003/0018629 A1 | 1/2003 | Namba |
| 2003/0018771 A1 | 1/2003 | Vinberg |
| 2003/0033402 A1 | 2/2003 | Battat et al. |
| 2003/0065764 A1 | 4/2003 | Capers et al. |
| 2003/0065805 A1 | 4/2003 | Barnes |
| 2003/0097286 A1 | 5/2003 | Skeen |
| 2003/0101086 A1 | 5/2003 | San Miguel |
| 2003/0154406 A1 | 8/2003 | Honarvar et al. |
| 2003/0187719 A1 | 10/2003 | Brocklebank |
| 2003/0225747 A1 | 12/2003 | Brown et al. |
| 2004/0024627 A1 | 2/2004 | Keener |
| 2004/0158568 A1 | 8/2004 | Colle et al. |
| 2004/0172466 A1 | 9/2004 | Douglas et al. |
| 2004/0181435 A9 | 9/2004 | Snell et al. |
| 2004/0186757 A1 | 9/2004 | Starkey |
| 2004/0186758 A1 | 9/2004 | Halac et al. |
| 2004/0199417 A1 | 10/2004 | Baxter et al. |
| 2005/0027585 A1 | 2/2005 | Wodtke et al. |
| 2005/0027845 A1 | 2/2005 | Secor et al. |
| 2005/0066026 A1 | 3/2005 | Chen et al. |
| 2005/0091269 A1 | 4/2005 | Gerber et al. |
| 2005/0114306 A1 | 5/2005 | Shu et al. |
| 2005/0136946 A1 | 6/2005 | Trossen |
| 2005/0138631 A1 | 6/2005 | Bellotti et al. |
| 2005/0159969 A1 | 7/2005 | Sheppard |
| 2005/0187929 A1 | 8/2005 | Staggs |
| 2005/0203917 A1 | 9/2005 | Freeberg et al. |
| 2005/0223392 A1 | 10/2005 | Cox et al. |
| 2006/0067252 A1 | 3/2006 | John et al. |
| 2006/0069607 A1 | 3/2006 | Linder |
| 2006/0112036 A1 | 5/2006 | Zhang et al. |
| 2006/0112050 A1 | 5/2006 | Miikkulainen et al. |
| 2006/0129906 A1 | 6/2006 | Wall |
| 2006/0168168 A1 | 7/2006 | Xia et al. |
| 2006/0178913 A1 | 8/2006 | Lara et al. |
| 2006/0224569 A1 | 10/2006 | DeSanto et al. |
| 2006/0224580 A1 | 10/2006 | Quiroga et al. |
| 2006/0235690 A1 | 10/2006 | Tomasic et al. |
| 2006/0282302 A1 | 12/2006 | Hussain |
| 2006/0287890 A1 | 12/2006 | Stead et al. |
| 2007/0043524 A1 | 2/2007 | Brown et al. |
| 2007/0055558 A1 | 3/2007 | Shanahan et al. |
| 2007/0073576 A1 | 3/2007 | Connors et al. |
| 2007/0073651 A1 | 3/2007 | Imielinski |
| 2007/0083419 A1 | 4/2007 | Baxter et al. |
| 2007/0118514 A1 | 5/2007 | Mariappan |
| 2007/0168225 A1 | 7/2007 | Haider et al. |
| 2007/0219958 A1 | 9/2007 | Park et al. |
| 2007/0234282 A1 | 10/2007 | Prigge et al. |
| 2007/0282470 A1 | 12/2007 | Hernandez et al. |
| 2007/0282644 A1 | 12/2007 | Diao et al. |
| 2007/0282645 A1 | 12/2007 | Brown et al. |
| 2007/0282653 A1 | 12/2007 | Bishop et al. |
| 2007/0282655 A1 | 12/2007 | Jaluka et al. |
| 2007/0282659 A1 | 12/2007 | Bailey et al. |
| 2007/0282692 A1 | 12/2007 | Bishop et al. |
| 2007/0282776 A1 | 12/2007 | Jaluka et al. |
| 2007/0282876 A1 | 12/2007 | Diao et al. |
| 2007/0282942 A1 | 12/2007 | Bailey et al. |
| 2007/0288274 A1 | 12/2007 | Chao et al. |
| 2007/0292833 A1 | 12/2007 | Brodie et al. |
| 2008/0065448 A1 | 3/2008 | Hull et al. |
| 2008/0109260 A1 | 5/2008 | Roof |
| 2008/0213740 A1 | 9/2008 | Brodie et al. |
| 2008/0215404 A1 | 9/2008 | Diao et al. |
| 2009/0012887 A1 | 1/2009 | Taub et al. |

OTHER PUBLICATIONS

BEA Systems, Inc., "BEA White Paper—BEA AquaLogic Service Bus—IT's Direct Route to SOA," printout from http://www.bea.com/content/news_events/white_papers/BEA_AQL_ServiceBus_wp.pdf, Jun. 2005.

Cape Clear Software, Inc., "Cape Clear 6.5", printout from http://www.capeclear.com/download/CC65_Broch.pdf, copyright notice 2005.

Cordys, "Cordys Enterprise Service Bus—Capabilities," printout from http://www.cordys.com/en/Products/Cordys_ESB_capabilities.htm, printed on Jun. 26, 2006.

Oracle, "Enterprise Service Bus," printout from http://www.oracle.com/appserver/esb.html, printed on Jun. 27, 2006.

PolarLake Limited, "Enterprise Service Bus (ESB) Resource Center," printout from http://www.polarlake.com/en/html/resources/esb/, printed on Jun. 27, 2006, copyright notice dated 2006.

Sonic Software, "ESB Architecture & Lifecycle Definition," printout from http://www.sonicsoftware.com/products/sonic_esb/architecture_definition/index.ssp, printed on Jun. 26, 2006.

Internet.com (http://www.webopedia.com/TERM/m/metadata.html).

Team Quest, Capacity Planning with TeamQuest Analytic Modeling Software, printed from http://www.teamquest.com/solutions-products/solutions/planning-provis....on Jun. 4, 2006.

Mercury, Mercury Capacity Planning (Powered by Hypertormix), 2004.

"A Capacity Planning Model of Unreliable Multimedia Service Systems", by Kiejin Park and Sungsoo Kim, Department of Software, Anyang University, Kangwha, Incheon, South Korea, Jul. 2001.

"Project MEGAGRID: Capacity Planning for Large Commodity Clusters", An Oracle, Dell, EMC, Intel Joint White Paper, Dec. 2004.

Ganesarajah, Dinesh and Lupu Emil, 2002, Workflow-based composition of web-services: a business model or programming paradigm?, IEEE Computer Society.

M.D. Harrison, P.D. Johnson and P.C. Wright. "Relating the Automation of functions in multi-agent control systems to a system engineering representation." Department of Computer Science, University of York, Heslington, York. UK. Aug. 13, 2004.

* cited by examiner

METHOD AND SYSTEM FOR DEVELOPING AN ACCURATE SKILLS INVENTORY USING DATA FROM DELIVERY OPERATIONS

FIELD OF THE INVENTION

The present invention generally relates to a method and system for creating an accurate skills inventory for skills retained by each independent human resource within a business concern. More particularly, the invention relates to a method and system that generates a metric for each resource, e.g., employee, contractor, etc., at the disposal of the business with respect to each of several identifiable skills.

BACKGROUND OF THE INVENTION

To be competitive in the market, it is important for a business to have an accurate skills inventory. That is, it is important for the business to accurately keep track of all of the available skill resources the business has at its disposal. Furthermore, because the acquisition of new skills as well as the expansion of existing skills for a given individual is constantly changing, for example, as individuals gain experience with respect to different tasks, it is increasingly more important for the business to be cognizant of its available skills. The cost of using inaccurate skills data can be very high and potentially lead to less efficient operation of the business, low customer satisfaction, erroneous site selection to deliver a service, etc.

Also, skills are a unit of measure by which services deals are costed and priced. Accordingly, maintaining accurate skills data is non-trivial. In accordance with at least some known related art methodology, skills databases are deterministically populated using an employee's "claimed" skills, a practice that does not reflect the "true" skill value. Also, as employees evolve in their job, the skills may not be updated to reflect the evolving skill value.

FIG. 2 illustrates a related art system where records 200 for each employee in a business are stored in a skills inventory database 100. Each of these records comprises information related to what skills the particular employee has. For example, resumes 300 provided by the employees indicate particular skills the employees have. Using a skills specification (not shown) to determine what data is important/relevant, one of the records 400 corresponding to a particular employee might include data informing that this employee has five years experience with Oracle, ten years of experience using the SAP application and four years of experience with the AIX operating system.

Although this information is beneficial to a degree, it is not completely accurate. For example, the information provided is done so by the employee and may not reflect the actual proficiency this employee has attained regarding the specified skills. Instead, the data only indicates years of experience, which does not always reflect an accurate level of proficiency. Further, the data provided regarding the number of years is very discrete. That is, it is provided in one year increments. It is unlikely that the employee has exactly five, ten and four years, respectively, experience with each of the skills. It is more likely that the respective amount of experience for each skill includes a partial year.

Accordingly, it is desirable to provide a method and a system for accurately assessing and storing the skills available to a business with respect to each employee and other human resources available.

SUMMARY OF THE INVENTION

Illustrative, non-limiting embodiments of the present invention address the aforementioned and other disadvantages associated with related art methods of skills inventory development and maintenance. In particular, in accordance with the present invention, the above and other drawbacks related to known skill data management are addressed by capturing, observing and analyzing data from runtime operations that impact skill values corresponding to the human resources of a business group.

In accordance with one exemplary embodiment, a method of establishing a skills inventory is provided, the method comprising monitoring the activity of a resource object with respect to an activity performed by the resource object, wherein the activity performed requires at least one skill identified in a list of specified skills, extracting data relevant to the at least one skill from results of said monitoring, computing a metric value indicative of a skill level attained by the resource object with respect to each of the at least one skill and updating a skills inventory database with the computed metric value.

According to a further exemplary embodiment of the invention, a computer program product for providing a service to reuse IT system knowledge is provided, the program product comprising a computer readable medium, first program instruction means for monitoring the activity of a resource object with respect to an activity performed by the resource object, wherein the activity performed requires at least one skill identified in a list of specified skills, second program instruction means for extracting data relevant to the at least one skill from results of said monitoring, third program instruction means for computing a metric value indicative of a skill level attained by the resource object with respect to each of the at least one skill, and fourth program instruction means for updating a skills inventory database with the computed metric value.

According to a further exemplary embodiment of the invention, a system for establishing an accurate skills inventory is provided. A system in accordance with this embodiment comprises means for monitoring at least one activity performed by a resource object (e.g., a first server portion), wherein the activity performed requires at least one skill identified in a list of specified skills; means for extracting data (e.g., the first server portion), wherein the data is relevant to the at least one skill from results of the monitoring of the activity; means for computing a metric value (e.g., a second server portion), wherein the metric value is indicative of a skill level attained by the resource object with respect to each of the at least one skill and means for updating a skills inventory database with the computed metric value (e.g., the second server portion). This embodiment further may include a skills inventory database that comprises at least one record corresponding to the resource object and each record comprises at least one independent metric value corresponding to a skill that the resource object possesses.

According to an even further exemplary embodiment of the invention, a system for establishing an accurate skills inventory is provided where the system comprises a first server portion operable to execute a skills data retrieval application, wherein the skills data retrieval application receives data from a runtime application that monitors the performance of a resource object while the resource object performs at least one task and a second server portion operable to calculate at least one metric value corresponding to the at least one task performed by the resource object, wherein each metric value accounts for a plurality of predetermined parameters relevant to its respective task.

DETAILED DESCRIPTION OF EXEMPLARY EMBODIMENTS

Figure 1:
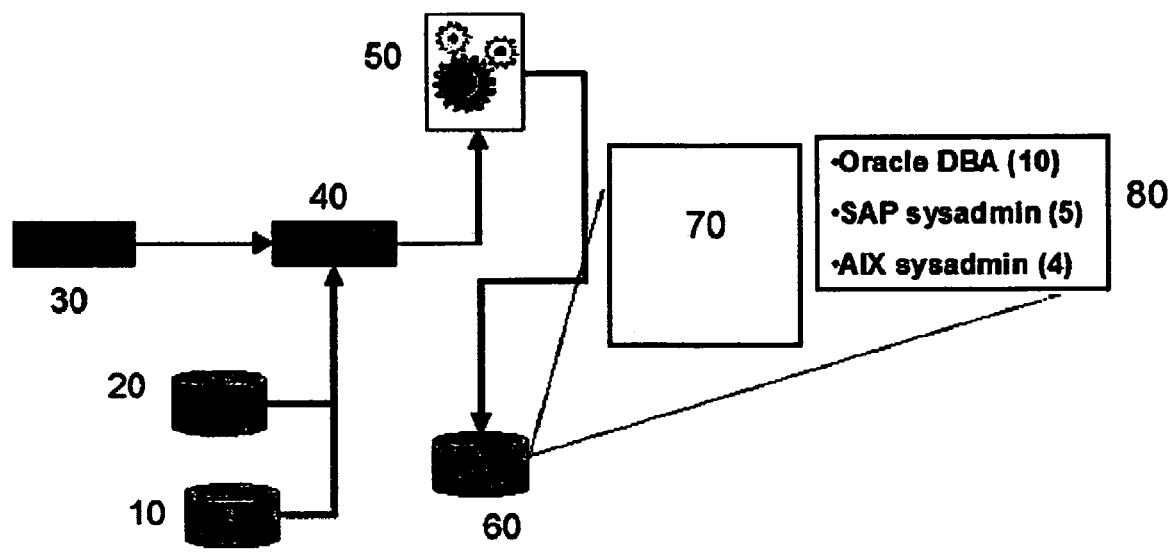
FIG. 1 is a process flow diagram of an embodiment in accordance with the invention.
Figure 2:
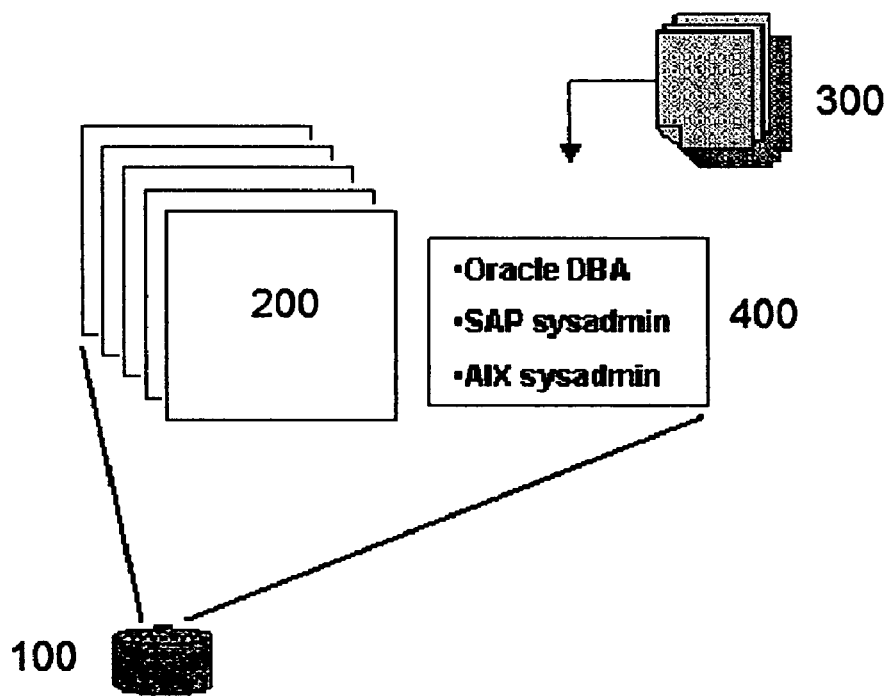
FIG. 2 is a process flow diagram of a related art method.

The present invention is related to the IT services area and, thus many technology-specific terms are used in describing the invention and providing the environment in which it operates. Skilled artisans would understand the intended meaning of the technology-specific terms used below, however, the following, non-exhaustive list of term definitions is provided to assist the reader. Although the list below provides a general definition of the respective terms, the definitions provided are not meant to be limiting. That is, the definitions provided are not exclusive and one skilled in the art should apply alternative or modified definitions where appropriate.

Employee Database: A database that maintains employee records and information about their skill set. Typically maintained by the HR organization in a company.

Skills Taxonomy: A classification methodology for specifying the types of skills relevant to an organization. For example, in IBM's services business, a taxonomy called JRSS (Job Requisition Skill Set) is used.

Runtime System/Runtime Operations: Refers to any system maintained by an organization that tracks and captures the history of the work done by its employees.

Ticketing System: An example of a runtime system in the services business. Records and tracks the various IT systems management requests made by a customer. Information includes the names of person(s) who work on the requests through various stages, the time taken, the kind of IT system the request applies to, etc. Examples used in the services business (by IBM and others) include eESM, Remedy, Peregrine, etc.

Information Model/Data Model: Refers to a data structure imposed on top of the records/logs of a runtime system that extracts the relevant fields in the records for further processing.

Exemplary, non-limiting, embodiments of the present invention are discussed in detail below. While specific configurations and process flows are discussed to provide a clear understanding of the invention, it should be understood that the disclosed process flows and configurations are provided for illustration purposes only. A person skilled in the relevant art will recognize that other process flows and configurations may be used without departing from the spirit and scope of the invention.

An embodiment consistent with the present invention comprises a method to accurately capture a value indicative of a person's skill with respect to various skills impacted by the person's activities. More particularly, a value which is indicative of the person's skill level is calculated by observing and analyzing the data from runtime operations that gather data in near-real-time as the person is gaining, or in some cases losing, experience with respect to various skills.

In accordance with at least one embodiment, data from various information sources, for example, problem and change ticketing systems, is analyzed to determine what tasks a particular person has worked on in the recent past. The tasks are then mapped to a standard skills classification methodology, or taxonomy, such as IBM's JRSS skill codes, or another taxonomy for which skill values can be gleaned.

For each skill code relevant to the particular person, a metric is computed that captures the skill level. The computed metric takes into account various relevant parameters, such as, the number of relevant tasks completed by the person, the time that was required to complete the task(s) and how long ago these tasks were performed. The calculated metric, together with the skill codes, is associated with the particular person and stored in a database.

In addition to the parameters mentioned above, those skilled in the art would know that other parameters of interest can be used without straying from the spirit of the invention.

First, a metrics database M with one record for each employee is created. Each record further contains a sub-record for each type of skills the employee has. This sub-record includes a score assigned to the employee for that skill type. For an employee with unique identifier $I$, the sub-record is referred to for skill type $S$, e.g., $M(I,S)$.

The following represents exemplary pseudo-code for the calculation of the metric value. In particular, for each record r in the runtime log the following is performed:

```
{
    Apply information model on the record to get structured record R;
    N = Extract employee name from R;
    I = Unique identifier for this employee;
    S = Extract skill type from R;
    T = Extract time the task was performed;
    Modify the skill sub-record for this employee as follows:
        M(I,S) = f ( M(I,S) , T , S ); This applies a function f to the
    metrics record, which depends on the previous value of the skill sub-
    record, the time and the skill used.
}
```

When the above loop ends, each record in the runtime database will have been processed, each kind of skill an employee has exercised will have been identified, and a score will have been assigned to each such skill.

The function f can be very general, since we can store any information in the skill sub-records and pass it as a parameter to the next computation of the sub-record.

An exemplary environment in which the present invention might be used is in the context of a company's Help Desk. In particular, a resource object, such as an employee working at the Help Desk, performs various tasks to achieve a particular result. For instance, a Help Desk employee may be working remotely over a network to resolve a customer's IT-related problem.

According to one Help Desk method, when a customer calls into the Help Desk to report a problem, a "ticket" is created for that call. The ticket includes data such as, the particular problem; to what hardware and/or software components the problem relates; the time problem resolution began; the time the problem was resolved, or, in some cases the time problem resolution was abandoned; what steps were taken in pursuit of a resolution, and any other relevant data.

FIG. 1 illustrates an embodiment in accordance with the invention and described in the context of the Help Desk example mentioned above.

While the resource object is performing his or her job function to resolve the customer's problem, at least one runtime application, such as runtime applications 10 and 20, gather data with respect to the process the employee undertakes in resolving the issue. That is, runtime applications 10 and 20 capture data with respect to the performance of the resource. For example, a runtime application such as eESM (IBM's eEnterprise Solutions Management application), logs data relevant to change management. Another example of a runtime application that captures data relevant to the resource's performance is ManageNow, which logs data for problem management. In addition to the applications mentioned, those skilled in the art would understand that various runtime applications that capture relevant data can be used in accordance with the present invention. That is, any application, or number of applications, that captures data in accordance with a specified taxonomy, described below, can be used in accordance with this embodiment.

As illustrated in FIG. 1, results of the runtime application (s), 10 and 20, are fed into an information model, 40, where the classification methodology, or taxonomy, 30, is implemented. More particularly, specific data is parsed from the runtime operations to be used in the calculation of the skills metric, 50, described in detail below. The skills metric calculated, e.g., for each resource object and for each skill determined by the given taxonomy, 30, is then recorded in a skills inventory database 60. As shown, the skills database, 60, includes at least one record, 70, corresponding to each resource object. The record comprises data, 80, indicating the calculated metric for each of the skills determined by the taxonomy, 30, to be of importance for that particular resource object. For the example shown in FIG. 1, the metric value calculated for Oracle skill is "10", the value for the SAP application skill is "5" and the value for the AIX operating system skill is "4".

Calculation of a metric in accordance with one exemplary embodiment of the present invention will now be described.

Using the Help Desk example discussed above, as an employee is working at the Help Desk, runtime programs such as eESM and ManageNow log data regarding the employee's performance. Data is extracted from the logs and an information model is imposed on the data using IBM's JRSS taxonomy.

According to this embodiment, three time periods are considered, i.e., periods 0, 1 and 2, each of a duration T. X(t) is the set of tickets closed in the $t^{th}$ time period, S(X(t)) is the total severity of these tickets, N(X(t)) is the number of tickets in the set and a is a weighting parameter. For example, a has a value less than 1 such that the larger values give more weight to activities performed by the resource object more recent in time and, alternatively, gives less weight to actions performed in the more distant past.

Based on the information model presented, the metric value for the given resource object with respect to a given skill is:

$$S(X(O))/N(X(O))X(1-a)^2+S(X(1))/N(X(1))Xa(1-a)+S(X(2))/N(X(2))Xa$$

After the metric is calculated, the skills inventory is updated with the calculated skill value, i.e., metric value calculated, for the given resource object for the particular skill type.

The invention can take the form of an entirely hardware embodiment, an entirely software embodiment or an embodiment containing both hardware and software elements.

In a further embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It would be understood that a method incorporating any combination of the details mentioned above would fall within the scope of the present invention as determined based upon the claims below and any equivalents thereof.

Other aspects, objects and advantages of the present invention can be obtained from a study of the drawings, the disclosure and the appended claims.

What is claimed is:

1. A method for developing a skills inventory, said method including:
   creating a record in a skills inventory database for skills of a resource object, the record including a sub-record for each skill possessed by the resource object, the sub-record including a score assigned to the resource object for the skill;
   monitoring an activity performed by the resource object, wherein the activity performed requires at least one skill of the skills;
   extracting data relevant to the at least one skill from results of said monitoring;
   computing a metric value with a server, wherein the metric value is indicative of a skill level attained by the resource object with respect to each of the at least one skill, wherein the metric value is computed using a number of similar activities the resource object has performed, an amount of time required by the resource object to complete the activity, relative success of the activity, how much time has passed since the activity was completed, and a weighing parameter that gives more weight to activities performed by the resource object more recent in time; and updating the skills inventory database with the computed metric value.

2. A method as claimed in claim 1, wherein said monitoring comprises:
operating a runtime application while the resource object performs the activity; and
logging relevant data in accordance with a specified skills classification methodology.

3. A method as claimed in claim 2, wherein the runtime application is an off-the-shelf ticketing application.

4. A method as claimed in claim 1, wherein said extracting comprises automatically extracting the data based on a previously specified skills classification methodology.

5. A method as claimed in claim 1, wherein the record corresponds to an employee of a company and the record includes a metric value for each of the skills.

6. A method as claimed in claim 1, wherein said computing comprises using stochastic analysis to calculate the metric value.

7. A method as claimed in claim 1, further comprising:
grouping a plurality of identified skills into at least one group of skills based on the technology area to which each skill relates;
associating each of at least one resource object into at least one of the groups of skills based on metric values associated to the resource objects for the identified skills.

8. A method as claimed in claim 1 further comprising allocating human resources to at least one task based on the contents of the updated skills inventory database.

9. A method as claimed in claim 1 further comprising classifying at least one resource object as a member of one of a plurality of groups based on at least one computed metric value.

10. A method as claimed in claim 9, wherein the plurality of groups comprises at least:
a generalist group comprising at least one resource object that is determined to have general expertise in an area of interest; and
a specialist group comprising at least one resource object that is determined to have specific expertise in the area of interest, wherein specific expertise requires a higher degree of expertise than general expertise, wherein the area of interest is identified by at least one of the skills in the skills inventory.

11. A computer program product for providing a service to reuse IT system knowledge, the program product comprising:
a computer readable storage medium;
first program instruction for monitoring the activity of a resource object with respect to an activity performed by the resource object, wherein the activity performed requires at least one skill in a skills inventory database;
second program instruction for extracting data relevant to the at least one skill from results of said monitoring;
third program instruction for computing a metric value indicative of a skill level attained by the resource object with respect to each of the at least one skill, wherein the metric value is computed using a number of similar activities the resource object has performed, an amount of time required by the resource object to complete the activity, relative success of the activity, and how much time has passed since the activity was completed, and a weighing parameter that gives more weight to activities performed by the resource object more recent in time; and
fourth program instruction for updating the skills inventory database with the computed metric value.

12. A computer program product as claimed in claim 11, further comprising:
fifth program instruction for operating a runtime application while the resource object performs the activity; and
sixth program instruction for logging relevant data in accordance with a specified skills classification methodology.

13. A computer program product as claimed in claim 12, wherein the runtime application is an off-the-shelf ticketing application.

14. A computer program product as claimed in claim 11, wherein the skills inventory database comprises at least one record, the record corresponding to an employee of a company and the record comprising a metric value for each of at least one skill.

15. A system for establishing an accurate skills inventory, the system comprising:
means for monitoring at least one activity of performed by a resource object, wherein the activity performed requires at least one skill in a skills inventory database;
means for extracting data relevant to the at least one skill from results of said monitoring;
means for computing a metric value indicative of a skill level attained by the resource object with respect to each of the at least one skill, wherein the metric value is computed using a number of similar activities the resource object has performed, an amount of time required by the resource object to complete the activity, relative success of the activity, and how much time has passed since the activity was completed, and a weighing parameter that gives more weight to activities performed by the resource object more recent in time; and
means for updating the skills inventory database with the computed metric value.

16. A system as claimed in claim 15, wherein the skills inventory database comprises at least one record corresponding to the resource object and each record comprises at least one independent metric value corresponding to a skill that the resource object possesses.

17. A system for establishing an accurate skills inventory, the system comprising:
a processor;
a first server portion operable to execute a skills data retrieval application, wherein the skills data retrieval application receives data from a runtime application that monitors the performance of a resource object while the resource object performs at least one task, wherein the runtime application is part of a ticketing system of a services business; and
a second server portion operable to calculate at least one metric value corresponding to the at least one task performed by the resource object, wherein each metric value accounts for a plurality of predetermined parameters relevant to its respective task, wherein the calculated metric for each task takes into account the number of tickets operated on by the resource object, a relative importance of the ticket, how long ago the ticket was closed, and a weighing parameter that gives more weight to activities performed by the resource object more recent in time.

* * * * *